(12) United States Patent
Wen

(10) Patent No.: US 6,219,881 B1
(45) Date of Patent: Apr. 24, 2001

(54) BRAKE FOR CASTER

(76) Inventor: Cheng-Kan Wen, No. 1, GuangHwa Rd., SanChung City, Taipei (TW)

( * ) Notice: Subject to any disclaimer, the term of this patent is extended or adjusted under 35 U.S.C. 154(b) by 0 days.

(21) Appl. No.: 09/428,474

(22) Filed: Oct. 28, 1999

(51) Int. Cl.[7] .................................................. B60B 33/00
(52) U.S. Cl. ............................................................ 16/35 R
(58) Field of Search ................... 16/35 D, 35 R; 188/1.12

(56) References Cited

U.S. PATENT DOCUMENTS

| | | | |
|---|---|---|---|
| 2,138,433 | * 11/1938 | Sunden | 16/35 D |
| 2,709,828 | * 6/1955 | Noelting et al. | 16/35 D |
| 3,162,888 | * 12/1964 | Mobus | 16/35 R |
| 3,911,525 | * 10/1975 | Haussels | 16/35 R |
| 4,205,413 | * 6/1980 | Collignon et al. | 16/35 D |
| 4,349,937 | * 9/1982 | Fontana | 16/35 R |

* cited by examiner

Primary Examiner—Chuck Y. Mah
(74) Attorney, Agent, or Firm—Dougherty & Troxell

(57) ABSTRACT

An improved brake for caster includes a reversed U shape bracket for holding a wheel thereunder, a load seat having a shaft engageable with an upper pivot hole formed in the bracket, a brake body constitutes a brake pad, an upper bar and a lower bar, a lever and a spring. The shaft has a round opening in the center and a plurality of shallow and deep grooves axially and alternately formed in the inside circumference of the round opening. The lever has a fulcrum on the load seat, a force applying point and a force reaction point located between the fulcrum and the force applying point. The top end of the brake body makes contact with the force reaction point. Through the interaction between the lever, spring and up or down movement of the brake body, the brake pad may make A forced contact with the wheel for braking or separate with the wheel to release braking. The lever does not move with the wheel and is convenient to use.

10 Claims, 7 Drawing Sheets

BRAKE FOR CASTER

FIELD OF THE INVENTION

This invention relates to an improved brake for caster and particularly to an improved brake that uses a brake pad to make forced contact with a caster wheel for braking.

BACKGROUND OF THE INVENTION

FIGS. 1 and 2 show a typical conventional brake means 2 for a wheel 1 in a caster.

The brake means 2 constitutes a bracket 21, a load seat 22, a brake body 23, and the wheel 1.

The bracket 21 is a reversed-U shape member and includes two side walls 211 and a top wall 213. The side walls 211 have two lower pivot holes 2112, a front shaft 2114 and a rear shaft 2116. The top wall 213 has an upper pivot hole 2132. The wheel is pivotly held by a bolt between the lower pivot holes 2112.

The load seat 22 includes a load plate 221, an upper cap 222 and a lower cap 223. The upper and lower caps 222 and 223 are mating against each other at two opposite side of the upper pivot hole 2132. In the caps 222 and 223, there are a plurality of steel balls 224 located thereon (also referring to FIG. 3). The load plate 221 is located above the upper cap 222. The lower cap 223 has slots 225 radically formed at the bottom. The load seat 22 may be freely rotating.

The brake body 23 includes a friction plate 231 and a pedal 232. The friction plate 231 is a<shaped member including an upper spring plate 2311 and a lower spring plate 2312. The upper spring plate 2311 has a brake tooth 2312 formed at one end. The pedal 232 has an ellipse cam 2322 formed at one end thereof which is engaged with the rear shaft 2116. The friction plate 231 has a front end pivotally engaged with the front shaft 2114 (shown in FIG. 3). The cam 2322 is held on the pedal 232 firmly.

Referring to FIG. 3, in the conventional caster the brake means 2 is engaged with the load plate 22 and is located at a lower portion of the caster. For braking the caster, the pedal 232 is pressed downward which turns the cam 2322 which in turn pushes the upper and lower spring plates 2311 and 2312 outward against each other until the brake tooth 2312 engaging with the slot 225 and the lower spring plate 2312 pressing against the wheel 1 for preventing the wheel from moving. The wheel 1 will also be prevented from turning (due to engagement of the brake tooth 23112 with the slot 225) (shown in FIG. 4). For releasing the brake, the pedal 232 is moved upward to return the cam 2322 to its initial position (FIG. 3). The upper and lower spring plates 2311 and 2312 are disengaged respectively with the slot 225 and the wheel 1. Then the wheel 1 may be moved and turned again.

There are disadvantages in the conventional caster mentioned above. For instance, when releasing the brake, the pedal 232 shall be moved up by people, mostly by hand. It is awkward for people to bend down to reach the pedal. The hand get smeared easily. Moreover the brake means 2 usually is mounted on the bracket 21. When the wheel 1 changes direction, the pedal 232 also change direction and might become non-accessible to users (e.g., being swivelled under the cart under which the casters are mounted). Trying to get the pedal moved out for people use is troublesome and could easily cause human injury or cause the cart to bump against other object or wall, and result in damage.

SUMMARY OF THE INVENTION

It is an object of this invention to provide an improved brake for caster that is operaionable by single foot either for braking or brake releasing to enhance maneuverability of the cart.

It is another object of this invention to provide an improved brake for caster that has a fixedly located brake pedal non-movable against the turning of the caster wheels for enhancing user convenience and maneuverability of the cart.

In one aspect, this invention includes a bracket, a wheel, a load seat, a lever, a spring and a brake body.

The bracket is formed in a reverse-U shape having two side walls and a top wall. The side walls have a pair of pivot holes for supporting a lower shaft to held the wheel. The top wall has an upper pivot hole formed therein.

The load seat constitutes two symmetrical side flanges connecting by a load plate located therebetween and a shaft which has a center round opening mating against a round bore formed in the center of the load plate. The shaft further has a plurality of deep grooves and shallow grooves formed alternately around the center opening.

The brake body includes a brake pad, an upper bar and a lower bar. The upper bar is a hollow tube having a plurality of first lugs formed on outside circumference mating with the deep and shallow grooves and jigsaw teeth formed at a bottom rim. The low bar is also a hollow tube having a barrel and a sleeve engageable with inside wall of the upper bar. The barrel has a plurality of second lugs formed on outside circumference mating with the deep grooves and jigsaw teeth formed at a top rim.

The brake pad has a stem passing through the lower and upper bar in the center and having an enlarged top end extending out of the round bore of the load plate. There is a spring located below the enlarged top end and above the load plate. The lever includes a fulcrum, a force applying point formed in a pedal, and a force reaction point between the fulcrum and the force applying point and making contact with the top end of the stem.

Through pressing the pedal (force applying point), the brake body will be moved downward to make forced contact between the brake pad and the wheel. The upper bar also will be moved downward for the top rim to press against the jigsaw bottom rim of the lower bar and drives the lower bar to turn. When the applying force is released, the second lugs of the low bar engages with the shallow grooves to lock and keep braking the wheel. When pressing the pedal (force applying point) for the second time, the brake body will be moved down again, the upper bar will trigger the low bar to turn again, but this time the second lugs will engage with the deep grooves. When the pedal is released again, the spring will push the stem and the brake upward to free the wheel from the brake pad. Then the brake is released.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
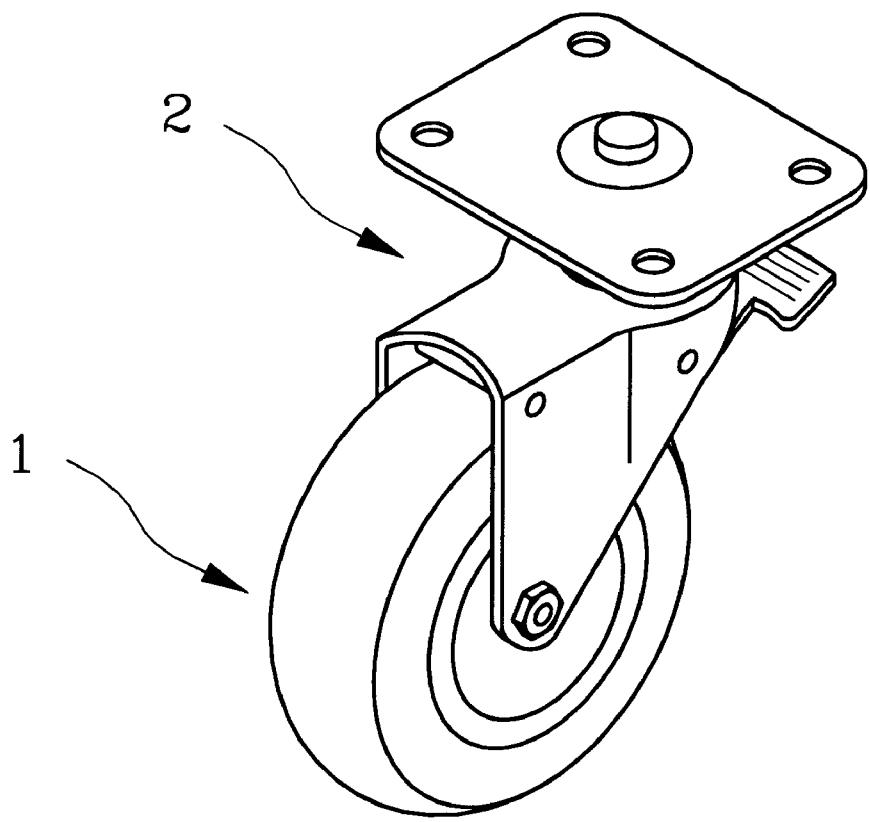
FIG. 1 a perspective view of a conventional caster.
Figure 2:
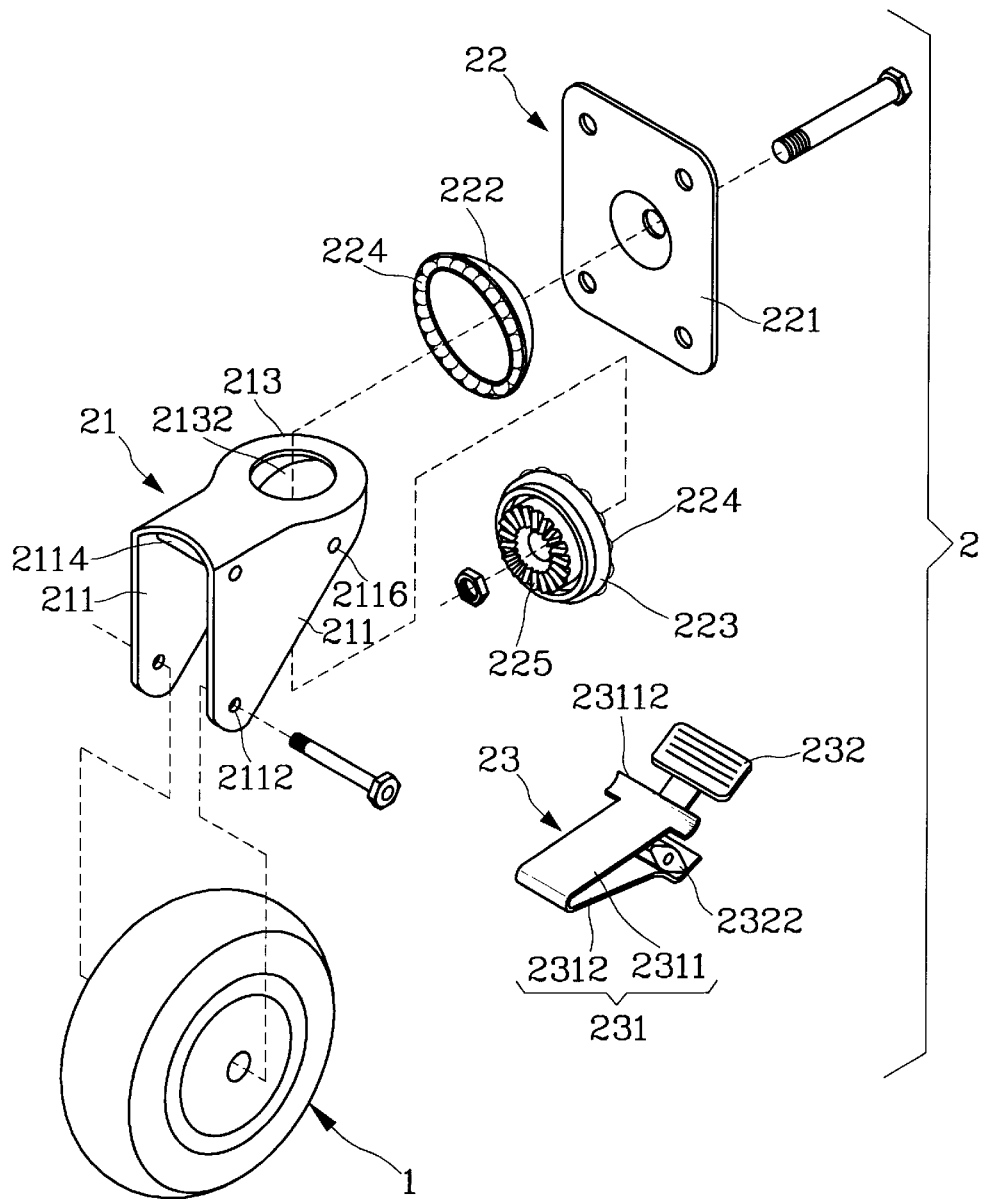
FIG. 2 is an exploded view of a brake means of a conventional caster.
Figure 3:
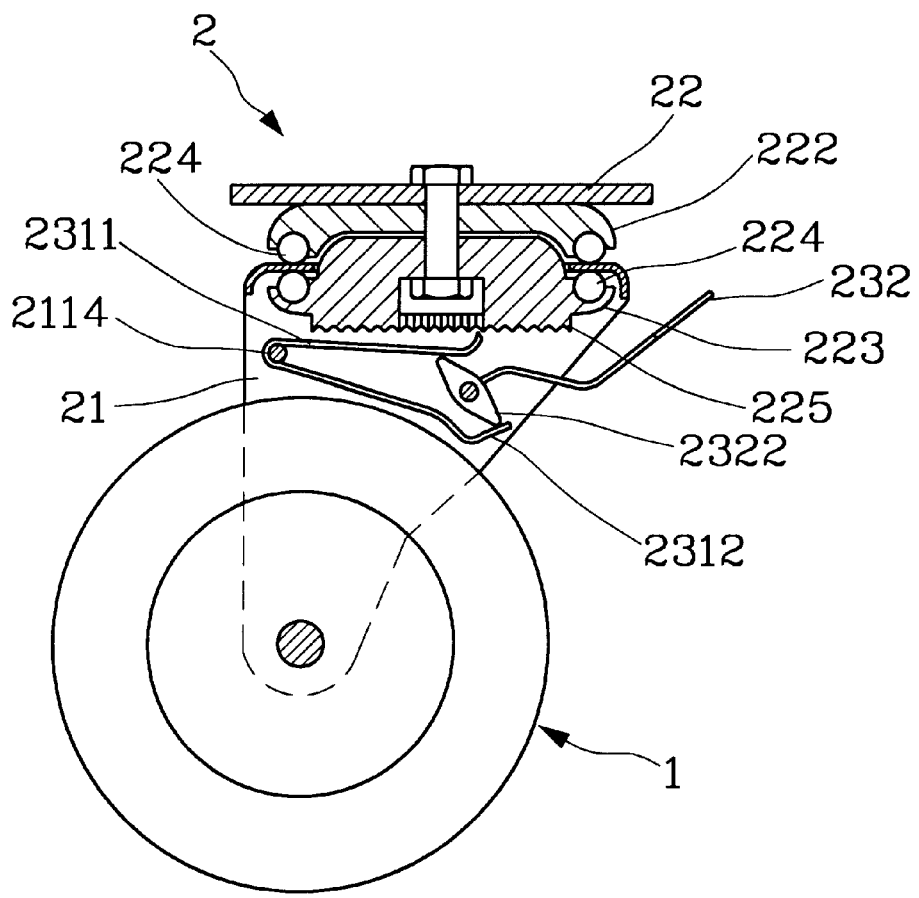
FIG. 3 a sectional view of the brake means shown in FIG. 2, at a brake-releasing state.
Figure 4:
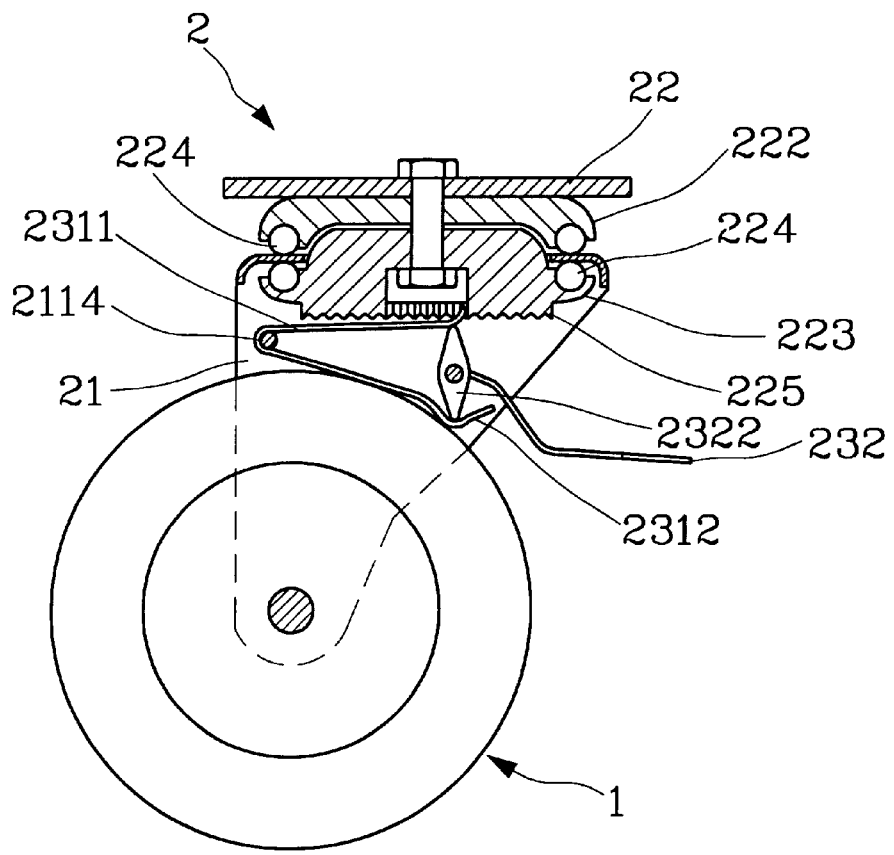
FIG. 4 is a sectional view of the brake mans shown in FIG. 2, at a braking state.
Figure 5:
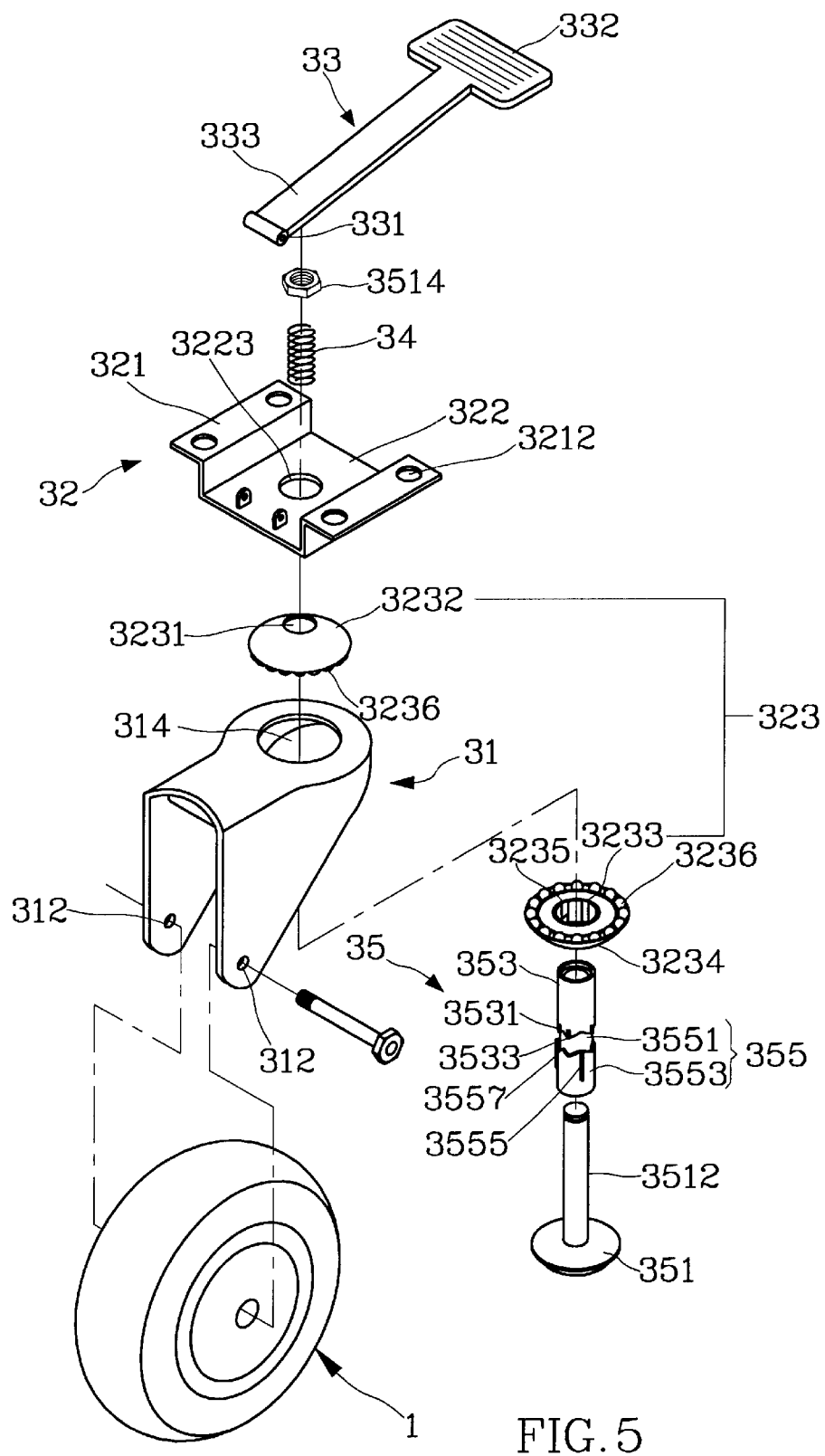
FIG. 5 is an exploded view of this invention.

Referring to FIG. 5, the brake means 3 for braking the wheel 1 according to this invention includes a bracket 31, a load seat 32, a lever 33, a spring 34 and a brake body 35.

The bracket 31 is formed in a reversed U shape with two side walls and a top wall. In the side walls, a pair of lower pivot holes 312 are formed to engage a bolt for holding the wheel 1. In the top wall, an upper pivot hole 314 is formed.

Figure 6:
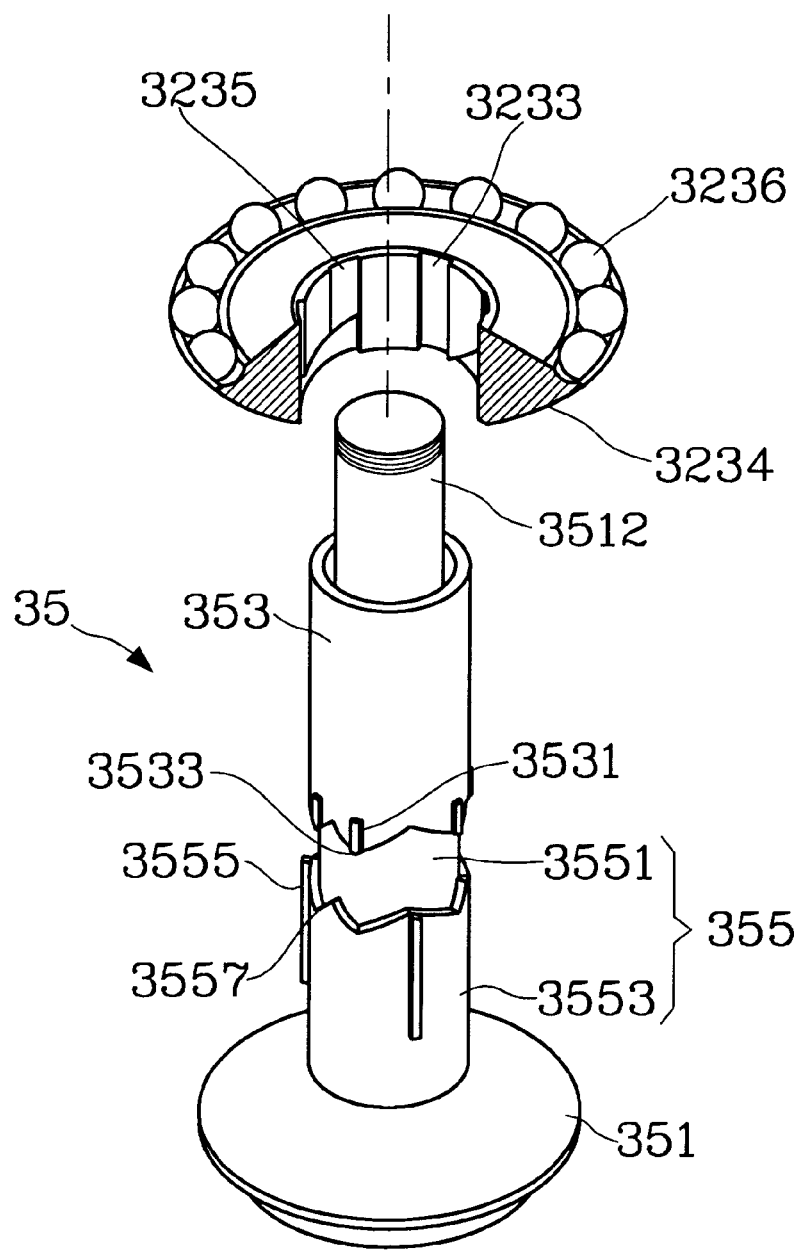
FIG. 6 is a fragmentary perspective view of a brake body and a shaft of this invention.

The load seat 32 includes two symmetrical ] shaped side flanges 321 connecting by a load plate 322 located therebetween and a shaft 323. The load plate 322 has a round bore 3233 formed therein. The shaft 323 includes an upper cap 3232 located below the load plate 322 and a lower cap 3234 located below the upper cap 3232 to sandwich the top wall of the braket 31 therebetween (also shown in FIG. 7). In the upper and lower cap 3232 and 3234, there are a plurality of steel balls 3236 held therein to facilitate rotation of the caster. The upper and lower cap 3232 and 3234 are pivotally held against the upper pivot hole 314. In the side flange 321, there are pluralities of screw holes 3212 for fastening the caster to a cart. The shaft 322 further has a round opening 3231 at the center mating with the round bore 3223 in the load plate 322. On the inside circumference of the round opening 3231, there are a plurality of shallow grooves 3235 and deep grooves 3233 axially and alternately formed (also shown in FIG. 6).

The lever 33 includes a fulcrum 331 engageable with the load plate 322 at one end thereof, a force applying point 332 which may be formed like a pedal and a force reaction point 333 located between the fulcrum 331 and the force applying point 332. Instead of the pedal, the force applying point may be linked through a transmission means to the handle of the cart upon which the casters being installed (not shown in the figure).

The brake body 35 includes a brake pad 351, an upper bar 353 and a lower bar 355. The upper bar 353 is a hollow tube having a plurality of first lugs 3531 formed on the outside circumference engageable with the shallow and deep grooves 3235 and 3233. The bottom rim 3533 of the upper bar 353 is formed in a jigsaw manner.

The lower bar 355 is also a hollow tube having a barrel 3553 and a sleeve 3551 which is engageable with inside wall of the upper bar 351. The barrel 3533 has a plurality of second lugs 3557 formed on the outside circumference for engaging with the deep grooves 3233. The top rim 3557 forms a jigsaw manner. The brake pad 351 is a round disk having a stem 3512 extended upward from the center. The stem 3512 runs through inside of the lower bar 325 and upper bar 353. The upper portion of the stem 3512 extends above the load plate 322 and engages with the spring 34 and forms an enlarged, top end 3514 which may also be a screw nut or a latch pin or a snap ring engaging with the top end of the stem 3512. The enlarged top end 3514 (being a screw nut shown in the FIG. 7) makes contact with the force reaction point 333 of the lever 33.

Figure 7:
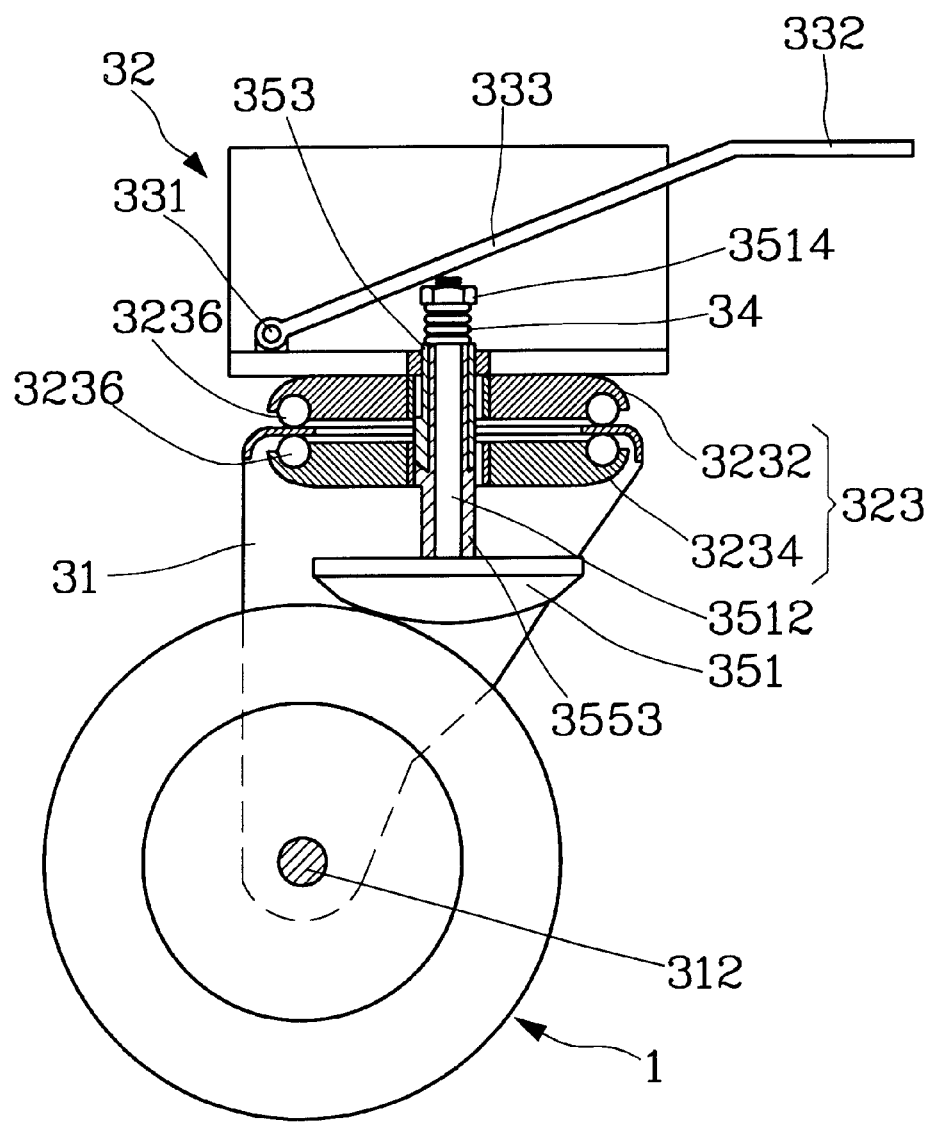
FIG. 7 is a sectional view of this invention in use, at a braking state.

Referring to FIG. 7, when this invention is in use, a user may step on the pedal (force applying point) 332 by a foot or apply force on the handle to trigger the transmission means to actuate the lever. The brake body 35 will be pressed downward because of the lever 33 and make the brake pad 351 braking the wheel 1, and compress the spring 34. During this downward movement, the jigsaw bottom rim 3533 presses against the jigsaw top rim 3537 and turn the lower bar 355.

When the applying force is released from the pedal 332, the second lugs 3555 engage with the shallow grooves 3235. Stepping on the pedal 332 again to press the brake body 35 downward, the lower bar 355 will be turned again (by the same principle set forth above). This time the second lugs 3555 will engage with the deep grooves 3233. When the applying force is released again, the spring 34 will push the screw nut 3514 upward and consequently move the stem 3512 upward. The brake pad 351 thus will be separated from the wheel 1 to release the brake. Because of the first lugs 3531, the upper bar 353 can only be moved up or down without turning.

By means of this invention, a user may perform brake or release brake by a foot or hand working on the handle of the cart. It is more convenient and handy. The pedal may be located at a fixed location desired on the cart.

It also makes operation and maneuver of the cart easier without the risk of hurting people or damaging surrounding environment. This invention may be used on any type of cart. The brake of this invention may also be used on a caster which contains two or more wheels.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An improved brake for caster, comprising:

bracket formed in a reversed U shape having respectively a lower pivot hole in two side walls and an upper pivot hole in a top wall thereof;

a load seat having two symmetrical side flanges connecting with a load plate therebetween and a shaft located below the load plate engageable with the upper pivot hole, the load plate having a round bore formed therein, the shaft having a round opening in the center thereof mating with the round bore and having a plurality of shallow grooves and deep grooves axially and alternately formed in an inside circumference of the round opening;

a brake body including a brake pad, a tubular upper bar and a tubular lower bar, the upper bar having a plurality of first lugs formed on outside circumference thereof engageable with the shallow and deep grooves and a jigsaw bottom rim, the lower bar including a sleeve engageable with inside wall of the upper bar and a barrel having a plurality of second lugs formed on outside circumference thereof engageable with the deep grooves and a jigsaw top rim, the brake pad having a stem running through inside of the lower and upper bar, the stem having an enlarged top end extending above the load plate;

a lever including a fulcrum, a force applying point and a force reaction point located between the fulcrum and the force applying point and being contact with the enlarged top end of the brake pad, and a spring engaged with the stem between the enlarged top end and the load plate;

wherein when the lever is forced to move the brake body downward, the brake pad brakes the caster and compresses the spring, the upper bar is moved downward and the bottom rim presses against the top rim to turn the lower bar; when the force is released from the lever, the second lugs engage with the shallow grooves to keep the caster braked; when the lever is forced down again, the upper bar is moved downward to turn the lower bar again and having the second lugs engaging with the deep grooves, when the force on the lever is released again, the spring pushes the stem and the brake pad upward for releasing the cater from braking.

2. The improved brake for caste of claim 1, wherein the shaft includes an upper cap and a low cap each having a plurality of steel balls held therein.

3. The improved brake for caste of claim 1, wherein the side flange is formed in a ⌋ shape.

4. The improved brake for caste of claim 1, wherein the force applying point is a pedal.

5. The improved brake for caste of claim 1, wherein the brake is located below a cart which has at least one handle, the force applying point connects with the handle through a transmission means.

6. The improved brake for caste of claim 1, wherein the side flanges have a plurality of screw holes formed therein.

7. The improved brake for caste of claim 1, wherein the bracket mounts more than two wheels.

8. The improved brake for caste of claim 1, wherein the top end of the stem engages with a screw nut.

9. The improved brake for caste of claim 1, wherein the top end of the stem engages with a latch pin.

10. The improved brake for caste of claim 1, wherein the top end of the stem engages with a snap ring.

* * * * *